July 28, 1970 J. GROSS 3,522,133
CUTTING AND SEALING PRESS
Filed March 13, 1967 2 Sheets-Sheet 1

INVENTOR.
JENOE GROSS
BY
OSTROLENK, FABER, GERB & SOFFEN
ATTORNEYS

July 28, 1970  J. GROSS  3,522,133
CUTTING AND SEALING PRESS
Filed March 13, 1967  2 Sheets-Sheet 2
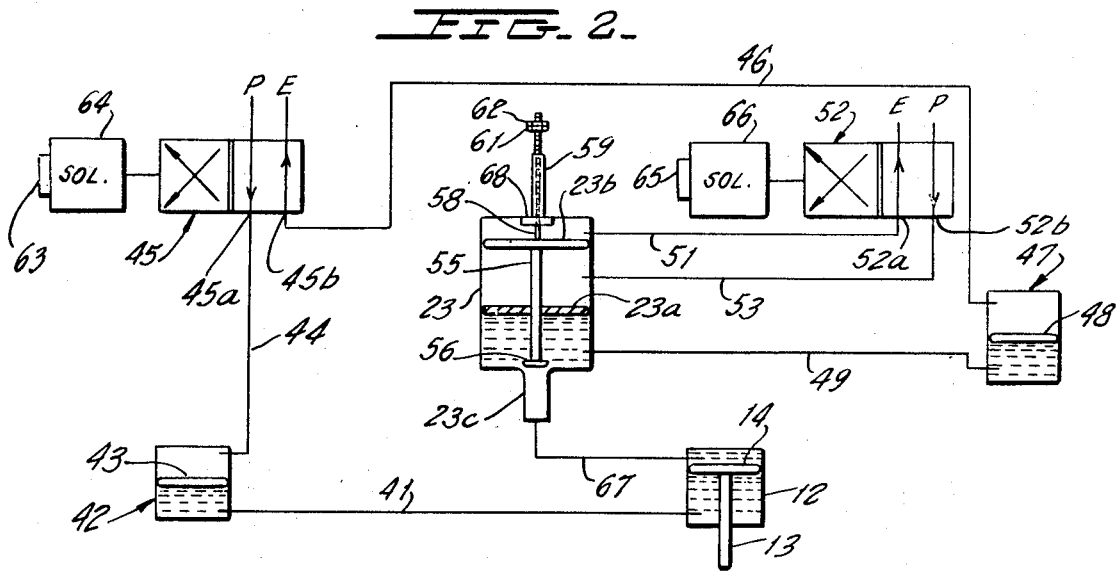
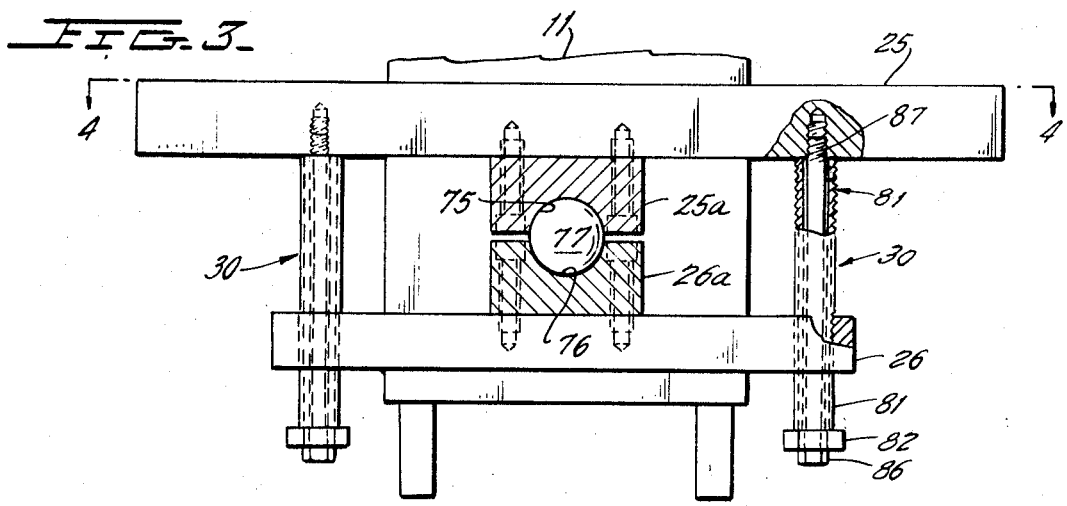
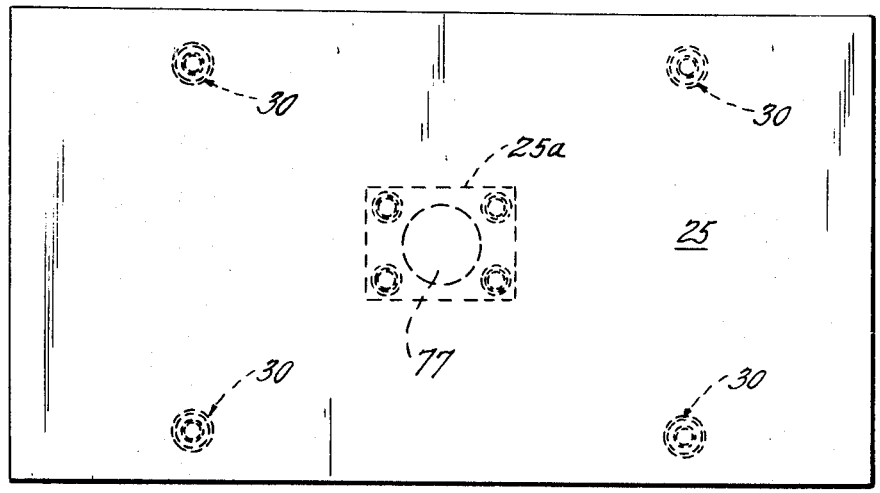

3,522,133
Patented July 28, 1970

---

3,522,133
CUTTING AND SEALING PRESS
Jenoe Gross, Kew Gardens, N.Y., assignor to Sealamatic Electronics Corp., Brooklyn, N.Y.
Filed Mar. 13, 1967, Ser. No. 622,713
Int. Cl. B23b 31/18
U.S. Cl. 156—515                  5 Claims

ABSTRACT OF THE DISCLOSURE

A press for heat sealing of reinforced thermoplastic sheet material is provided with a universal support at the center of the bed plate to facilitate leveling of the bed plate and provide mechanical support at the center thereof. The movable platen is operated by a fluid cylinder having high and low pressure controls with the latter control including a pressure booster having a single screw type adjustment for precise control of platen movement during a high pressure cutting operation following the relatively low pressure heat sealing operation.

---

This invention relates to heat sealing equipment in general and more particularly relates to a heat sealing press having novel support and leveling means for the press bed and novel means for controlling platen stroke during a relatively high pressure cutting operation which follows a relatively low pressure sealing operation.

As is well known in the art, heat sealing of a sheet of thermoplastic material either to another sheet of similar material or to a cloth fabric is usually done in a press since pressure must be applied to the plastic area being heated in order to insure good sealing. In the prior art, presses used for heat sealing have had a number of undesirable characteristics that have been eliminated by the construction of the instant invention to be hereinafter described.

More particularly, in prior art presses having relatively large size beds it is necessary to construct the beds of very heavy material so that they may withstand high pressures, especially in the unsupported central region thereof. The center section is unsupported because means are provided to level the bed plate and such leveling means support the plate only at the corners thereof.

The instant invention overcomes this difficulty of the prior art by providing a spherical support at the center of the bed plate. This enables relatively high pressure to be applied at the center of the bed plate and permits universal tilting motion for the bed plate to facilitate leveling thereof.

In presses of the type under consideration not only are heat sealing operations performed but following a sealing operation, a cutting operation is performed. The force applied to the movable platen for cutting of cloth fabric is much greater than the force that may safely be applied during the heat sealing operation. In prior art presses, movement of the platen during the cutting portion of the stroke has been controlled by measuring pressure in the line feeding the fluid actuated work cylinder. With such an arrangement, platen movement was limited only by back pressure fed to the line as the cutting die engaged the covering of the press bed. Thus, the cutting die and the buffer material on the press bed were subjected to excessive pressures applied in a haphazard manner so that these elements wore out very quickly.

The device of the instant invention provides a novel means for controlling the length of the high pressure stroke by utilizing a booster having provisions for readily adjusting piston stroke and a measured amount of high pressure fluid is transmitted to the work cylinder. Booster operation is such that since output pressure is greater than input pressure, the work cylinder output stroke due to booster action is much less than the booster stroke so that a relatively large adjusting motion is required to obtain a slight change in output stroke length thereby facilitating adjustment of output stroke length.

Accordingly, a primary object of the instant invention is to provide a novel construction for a heat sealing press.

Another object is to provide a heat sealing press having novel support and leveling means for the press bed.

Still another object is to provide a heat sealing press of this type having a spherical support at the center of the press bed.

A further object is to provide a heat sealing press having novel means for adjusting a relatively high pressure cutting stroke.

Still another object is to provide a heat sealing press in which cutting stroke length is readily adjustable by a screw type means and cutting pressure is achieved by a fluid pressure booster.

Yet another object is to provide a press with a power booster control constructed to transfer a predetermined amount of fluid to a work cylinder to perform a high pressure cutting operation.

These as well as other objects of this invention will become readily apparent after reading the following description of the accompanying drawings in which:

FIG. 2 is a schematic showing the fluid pressure control system for operating the press platen.

FIG. 3 is a fragmentary front elevation showing the bed plate having the center thereof mounted on a spherical support.

FIG. 4 is a plan view of the bed plate of FIG. 3.

Figure 1:
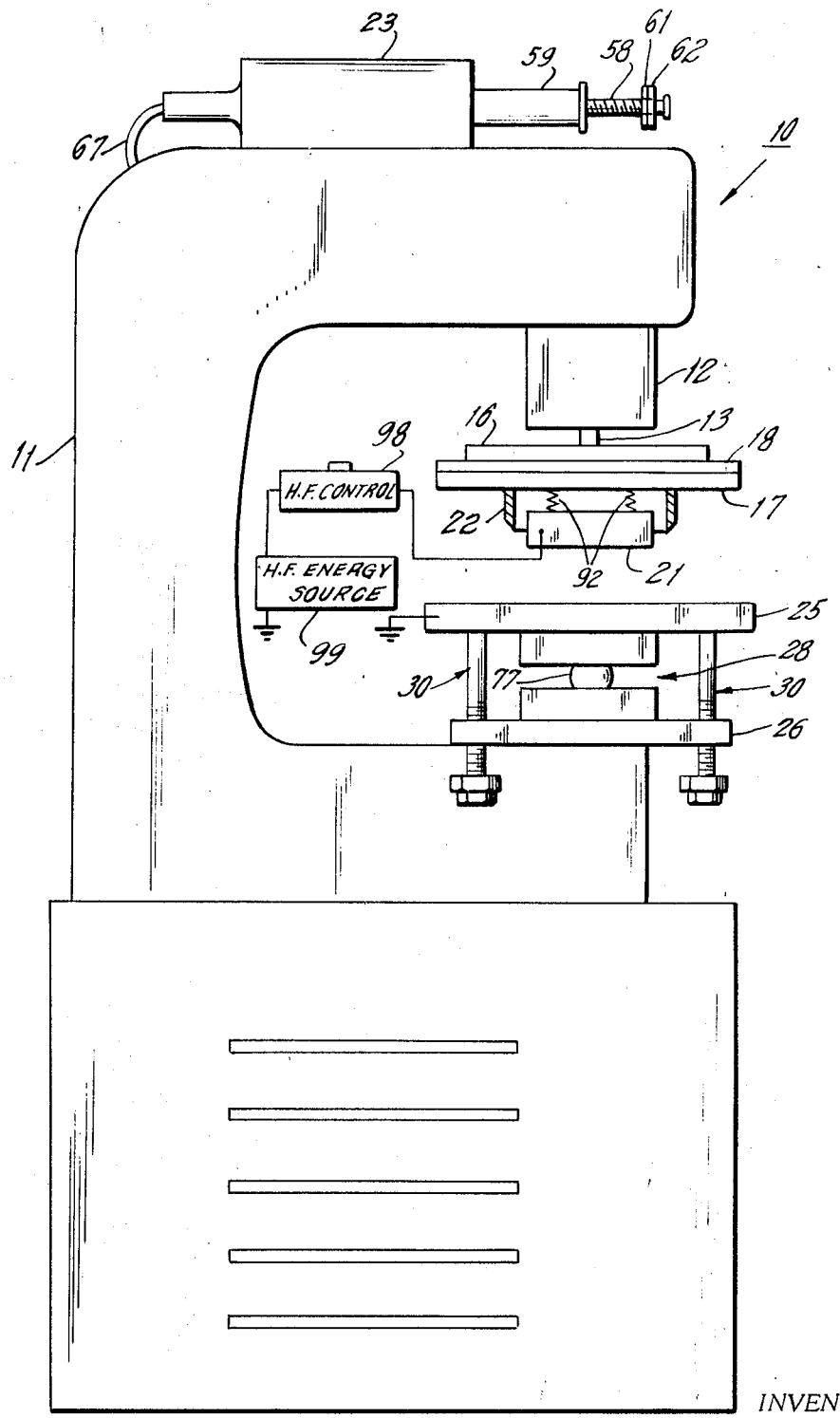
FIG. 1 is a side elevation of a heat sealing press including the novel features of the instant invention.

It is noted that for the sake of simplicity without sacrificing clarity, only those electrical and fluid connections necessary for a thorough understanding of the instant invention are illustrated in the drawings.

Now referring to the figures. Teat sealing press 10 includes conventional spaced vertical frame members each having a C-shaped portion 11 at the upper end thereof. Double acting fluid work cylinder 12 is secured to the upper C-arm with work shaft 13 extending downward from cylinder 12 and secured at its lower end to movable platen 16. Sub-platen 17 is secured to platen 16 by means not shown with insulating member 18 interposed between platens 16, 17. In a manner well known to the art, posts (not shown) are connected to frame members 11 and platen 16 to stabilize vertical motion of the latter as work shaft 13 is operated.

Depending from the lower surface of sub-platen 17 is brass heat sealing die 21 operatively positioned by a lost motion connecting means including springs 92, 92, so that as platen 16 moves downward, after initial engagement of die 21 with the material (not shown) on bed plate 25, platen 16 continues to move downward loading springs 92 to the extent necessary for achieving a good heat seal. Heat sealing energy is supplied to die 21 by electronic H.F. source 99 through control switch 98.

Fixedly mounted on the lower surface of sub-platen 17 is steel cutting die 22 which engages and cuts material supported by bed plate 25. In a manner to be hereinafter described in detail, fluid pressure booster 23 mounted to frame 11 is used to control the length of the high pressure stroke necessary to effect cutting by die 22. Each of the corners of bed plate 25 are secured to sub-plate 26 by a leveling assembly 30 to be hereinafter described in detail. Sub-plate 26 is mounted to the lower leg of C-shaped frame section 11. Spherical support means 28, to be hereinafter described in detail, is interposed between bed plate 25 and sub-plate 26 to provide a central support for the former.

Now referring more particularly to FIG. 2 for a detailed description of the means connecting booster 23 to work cylinder 12 as well as the means for controlling operations of booster 23 and cylinder 12. Work shaft 13 is connected to piston 14 closely fitted to the interior wall of oil filled double acting work cylinder 12. The lower end of cylinder 12 is connected through fluid line 41 to the lower oil filled portion of retract oil reserve tank 42 having piston-like baffle 43 therein. Fluid line 44 connects the air filled portion of tank 42 above baffle 43 to one of the output ports 45a of solenoid operated two-way control valve 45. The other ouput port 45b of valve 45 is connected through fluid line 46 to the air filled portion of forward oil reserve tank 47 above piston 48. The lower oil filled portion of tank 47 is connected by fluid line 49 to the oil filled portion at the lower end of booster 23 below partition 23a. The oil filled portion of booster 23 above piston 23b is connected through fluid line 51 to one of the output ports 52a of solenoid operated two-way control valve 52 while the other output port 52b of valve 52 is connected through fluid line 53 to the oil filled portion of booster 23 between pistons 23a and 23b.

Depending from piston 23b at the center thereof is piston rod 55 which extends through a closely fitted aperture at the center of partition 23a. The lower end of rod 55 carries piston 56 which is of considerably smaller diameter than pistons 23a, 23b. As will hereinafter be explained, when rod 55 moves downward piston 56 enters into the reduced diameter portion 23c at the bottom of booster 23 with the cylindrical wall of booster portion 23c being closely fitted to piston 56.

Rod 58 extends from the center of piston 23b upward through a seal in the top of booster 23 and through stop tube 59 extending upwardly from booster 23. The upper end of rod 58 extends beyond the upper end of tube 59. Adjusting nut 61 and lock nut 62 are threadably mounted to rod 58 and, as will be hereinafter explained, cooperate with the upper end of stop tube 59 to limit the movement of platen 16 during the application of high pressure to work cylinder 12.

In a manner well known to the art, valve 45 is operated from the position shown in FIG. 2 to its other position when the control button 63 is operated to cause energization of solenoid 64. In the position shown for valve 45, output port 45a is connected to a source of air under pressure while output port 45b is connected to exhaust. In the other position for valve 45, output port 45a is connected to exhaust and output port 45b is connected to a source of air under pressure. Similarly, when control button 65 is operated to energize solenoid 66, valve 52 is operated from the position shown in FIG. 2 to a position wherein port 52a is connected to a source of air under pressure and port 52b is connected to exhaust.

With the elements of FIG. 2 occupying the positions shown, platen 16 is in the raised position of FIG. 1 in that pressure appearing at output port 45a is applied through line 44, piston 43, and line 41 to the lower end of work cylinder 12. When solenoid 64 is energized through the operation of manual control 63, valve 45 shifts position and in so doing pressure appearing at output port 45b acts through line 46, piston 48, line 49 and line 67 to apply relatively low pressure to the upper surface of piston 14. At the same time the connection of output port 45a to exhaust permits oil below piston 14 to be driven back into reserve tank 42. During the preceding operations, booster piston 23b remains in the raised position shown in FIG. 2 with stop 68 secured to rod 58 engaging the upper end of booster cylinder 23. This condition takes place by virtue of the fact that pressure appearing at output port 52b is applied through line 53 to the area below piston 23b and the area above piston 23b is connected to exhaust through line 51 and output port 52a.

Downward movement of work shaft 13 is stopped when the back force offered by the workpieces (not shown) on bed 25 upon engagement by sealing die 21 and cutting die 22 equals the force being exerted by work cylinder 12 when actuated by relatively low pressure fluid fed to cylinder 12 upon actuation of control valve 45.

Thereafter, energization of solenoid 66 operates control valve 52 so that the area immediately below piston 23b is connected to exhaust through line 53 and output port 53b while pressure appearing at output port 52a is applied through line 51 to the region of booster cylinder 23 above piston 23b. This causes piston 23b and rod 55 to move downward immediately moving piston 56 into the narrow section 23c of booster cylinder 23. At this point, pressure applied to relatively large piston 23b creates a force which is transmitted by rod 55 directly to the relatively small area piston 56 so that the relatively low pressure appearing above piston 23b is multiplied into a relatively high pressure below piston 56a. This increases the oil pressure acting above piston 14 thereby driving work shaft 13 downward with sufficient force to drive knife 22 through the work material on bed plate 25.

The downward stroke of rod 55 is limited through the engagement of adjusting nut 61 with the end of stop tube 59 remote from booster 23 so that during a full downward stroke of rod 55 a predetermined quantity of high pressure fluid is transmitted to work cylinder 12. Because of the pressure multiplication taking place through the operation of booster 23 movement of work shaft 13 during the stroke of rod 55 is much less than the stroke length for rod 55. Thus, a fine adjustment for the cutting stroke is obtained by utilizing a relatively coarse adjustment control consisting of nut 61 threadably mounted at the upper end of rod 58.

As best seen in FIGS. 3 and 4, bed plate 25 is provided with block 25a secured to the lower surface thereof at approximately its center. Block 25a is provided with spherical segment seat 75 which receives steel ball 77. The latter rests against spherical segment seat 76 of block 26a secured to the upper surface of sub-plate 26 at the center thereof. As will hereinafter be explained, four independently adjustable leveling assemblies 30 at the corners of sub-plate 26 maintain bed plate 25 in fixed relationship with respect to sub-plate 26. Since each of the assemblies 30 is of identical construction and functions in the same way, only the construction of one of these assemblies will be described.

Assembly 30 includes bolt 81 threadably mounted to sub-plate 26 and vertically extending therethrough with the free end of bolt 81 being flat and engaging the underside of bed plate 25. Head 82 of bolt 81 is positioned below sub-plate 26 and is spaced therefrom. Locking screw 85 extends through a longitudinal bore of bolt 81 and is received in threaded recess 87 in the bottom of bed plate 25 with the head 86 of screw 85 engaging bolt head 82 to lock the latter against rotation.

Thus, it is seen that the instant invention provides novel means for controlling the length of a cutting stroke in a heat sealing and cutting press. Centrally located spherical means support the bed plate so that it is able to withstand huge forces yet there is no interference with leveling of the bed plate.

Since the novel features of the instant invention have heretofore been described in detail and a complete understanding thereof does not require an explanation of conventional electrical and/or fluid operated control and interlock elements, such elements are not described in the foregoing specification.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. In a press of the class described having a platen means including a relatively stationary first portion and a relatively movable second portion confronting said first portion, means mounting said second portion for movement along a predetermined path toward and away from said first portion, heat sealing die means and cutting die means mounted to said platen means, means for applying heat sealing energy to said heat sealing die means when said second portion has reached a sealing position, in which the improvement comprises an actuating means for effecting movement of said second portion; said actuating means including a fluid operated working section connected to said second portion, a first control section for transmitting fluid at a first pressure to said working section for moving said second portion toward said first portion to said sealing position, a second control section for transmitting a predetermined quantity of fluid to said working section at a second pressure materially greater than said first pressure, upon actuation of said second control after said second section has reached said sealing position said working section moving said second portion toward said first portion through a cutting stroke during which said cutting die means is adapted to perform a cutting operation, said second control including adjustable stop means for adjusting the magnitude of said predetermined quantity of fluid at said second pressure transmitted to said working section whereby said cutting stroke is adjustable in length.

2. A press as set forth in claim 1 in which the adjustable stop means includes an elongated threaded member.

3. A press as set forth in claim 1 in which the second control includes a fluid pressure booster.

4. A press as set forth in claim 3 in which the booster includes a cylinder and a piston closely fitted within said cylinder, said adjustable stop means including an elongated member mounted to said piston and extending externally of said cylinder.

5. A press as set forth in claim 4 in which said piston is subjected to fluid at input pressure admitted to said cylinder, said adjustable stop means also including a fixed cylinder and nut means, said elongated member extending longitudinally through said cylinder and having a threaded part extending externally of said cylinder, said nut means mounted to said threaded part and engageable with said cylinder to limit movement of said piston when said piston is subjected to said fluid at input pressure.

References Cited

UNITED STATES PATENTS

| | | | |
|---|---|---|---|
| 659,532 | 10/1900 | Jordan | 248—181 X |
| 2,940,784 | 6/1960 | Fell | 248—180 |
| 3,015,600 | 1/1962 | Cook | 156—515 X |
| 3,413,173 | 11/1968 | Long | 156—380 |

VERLIN R. PENDEGRASS, Primary Examiner

U.S. Cl. X.R.

156—583